United States Patent [19]

Ashkin et al.

[11] 3,769,096

[45] Oct. 30, 1973

[54] PYROELECTRIC DEVICES

[75] Inventors: Arthur Ashkin, Rumson; John George Bergman, Jr., Morganville; James Hoffman McFee, Colts Neck, all of N.J.

[73] Assignee: Bell Telephone Laboratories, Incorporated, Murray Hill, N.J.

[22] Filed: Mar. 12, 1971

[21] Appl. No.: 123,725

[52] U.S. Cl........ 136/213, 250/83.3 R, 250/83.3 H, 252/500, 338/18

[51] Int. Cl................................................. H01c 7/08

[58] Field of Search.................. 313/14; 250/83.3 H; 136/213; 338/18, 25, 32; 252/500

[56] References Cited

UNITED STATES PATENTS

| | | | |
|---|---|---|---|
| 3,278,783 | 10/1966 | Brissot et al. | 136/213 |
| 3,428,892 | 2/1969 | Meinhard | 252/500 X |
| 3,088,670 | 5/1963 | Perls et al. | 136/213 |
| 3,581,092 | 5/1971 | Pearsall et al | 136/213 UX |

OTHER PUBLICATIONS

Kocharyan et al., Proelectric Effect in Polarized Poly(Vinyl Chloride) Chemical Abstracts, Vol. 69, 1968, p. 2,638.

Nuclear Science Abstracts, "Method for Direct Conversion of Heat Energy to Electric Energy," No. 5984.

Japanese Journal of Applied Physics, Vol. 8, p. 975.

*Primary Examiner*—Carl B. Quarforth
*Assistant Examiner*—E. E. Lehmann
*Attorney*—Edwin B. Cave and W. L. Keefauver

[57] ABSTRACT

Sensitive pyroelectric detectors are readily fabricated from thin films of organic polymer materials having net dipolar moments. Such materials, exemplified by polyvinylidene fluoride, are prepared for use by mechanical working so as to produce crystallographic alignment and by electrical poling so as to produce dipolar orientation. Depending upon a variety of factors such as molecular weight, operating temperature, etc., remanent polarization may be sufficient to permit discontinuance of poling during use.

1 Claim, 2 Drawing Figures

PATENTED OCT 30 1973 3,769,096

INVENTORS: A. ASHKIN
J. G. BERGMAN, JR.
J. H. MC FEE
BY George S. Indig
ATTORNEY

PYROELECTRIC DEVICES

BACKGROUND OF THE INVENTION

1. Field of the Invention

The invention is concerned with pyroelectric devices. Present interest is concerned, inter alia with use of such devices as light detectors, e.g., in laser communication systems.

2. Description of the Prior Art

Increasing interest in the fundamental properties and practical utilization of electromagnetic radiation, particularly coherent radiation, has prompted study in a number of related fields. Many of these studies have been concerned with apparatus ancillary to emission. Such studies have involved modulators, frequency converters, isolators, transmission lines and detectors.

Radiation detectors are required for fundamental laboratory studies and also for most commercial utilization which generally requires means for detecting the presence of, and any modification in, the nature of the radiation.

Recent developments have focused attention on a characteristic which for many years has been a laboratory curiosity. This characteristic, pyroelectricity, is broadly defined as the property of matter which results in generation of a voltage during a period of changing temperature. Many writers consider this effect to be of two general types. The first may occur in a piezoelectric material which has no dipole moment under static conditions, and this "second-order" effect is sometimes denoted "false piezoelectricity." The second type additionally requires a net dipolar moment under static conditions and therefore may occur only in a more limited class of materials. This latter type may be a larger order effect, and present interest in pyroelectric devices is largely restricted to the use of materials evidencing this latter type of pyroelectricity.

Recent interest in pyroelectricity has largely centered on the use of this characteristic for radiation detection. It had been known for some time that the pyroelectric effect was useful over the entire inherent or imposed absorption range of the material. It was known that use could be made of this manifestation over an extensive range of infrared wavelengths, as well as in the visible spectrum and at still shorter wavelengths. This was considered to be of interest because detection sensitivity and/or response time of common detectors operating in the infrared is known to be inadequate for many purposes, particularly as wavelength increases.

Until recently, however, it was believed that pyroelectric detectors were frequency limited in terms of the modulation frequency of the infrared or other carrier. It was believed that this limitation came about from a mechanical resonance due to the piezoelectric response attendant on the volume change due to the temperature change of the medium.

More recently, however, it was determined that the two manifestations (in "true" pyroelectric materials), (1) the pyroelectric effect due to a change in moment in dipoles which had their origin in the symmetry of the system, and (2) piezoelectric "ringing" could be separated. The first observation entailed the use of a particular material, a mixed crystal of barium strontium niobate. This material responded to modulation frequencies which were at least an order of magnitude higher than the lowest fundamental resonance frequency of the crystal. Studies designed to trace the origin of this unusual behavior resulted in the finding that this composition had sufficiently high acoustic loss to inherently provide damping of the piezoelectric ringing effect. Indeed, this was verified by the observation that other lossy materials were also not limited to response below mechanical resonance frequencies. See Vol. 13, *Applied Physics Letters*, p. 147 (1968).

The final development provided for sufficient acoustic loss by "clamping," i.e., by gluing or otherwise coupling to a body of sufficient mass. In accordance with this most recent development, materials of otherwise excellent pyroelectric properties but also of sufficiently high acoustic quality as ordinarily to be limited by resonance are made to respond to high frequency modulation. An illustrative material on which reported experiments have been conducted is lithium tantalate. See Vol. 41, *Journal Applied Physics*, p. 4,455 (1970).

These developments have focused attention on the use of pyroelectric devices for detection (and for other purposes involving subcarriers and imposed modulation on carriers in the visible or near visible spectra). Of course, fabrication is complicated by the usual problems attendant upon the use of relatively large sections of high perfection single crystals. This is a particular problem where the radiation is not well focused and where the intensity at the detector is fairly low. Such circumstances which may, from the engineering standpoint, dictate use of large detectors, of the order of fractions of a square inch or greater, are not easily satisfied where the available techniques involve slicing and polishing. This is further complicated by other considerations which may dictate dimensions of the order of mils or less in the direction of the impinging radiation.

SUMMARY OF THE INVENTION

In accordance with the invention, pyroelectric detectors are constructed of any of a variety of organic polymer materials. Such materials are readily available or readily fabricated into sections of the required area and thickness.

Suitable materials include members which have already been reported as being piezoelectric. See for example Vol. 8, *Japanese Journal of Applied Physics*, p. 975 (1969).

Required characteristics which are set forth in some detail in a later section are briefly described. To be suitable for the practice of the invention, polymer materials must have a net dipolar moment. Since the magnitude of the pyroelectric effect depends on the strength of the dipolar moment, the substituent grouping responsible is chosen from those known to produce high moment. Since polymers of concern are made up of chains which are primarily or at least largely carbon, the substituent grouping is so chosen as to have an electro-negativity substantially different from that of carbon. A particularly useful bond is the carbon-fluorine bond and a preferred class of materials is exemplified by polyvinylidene fluoride. Of course, the general requirement of net moment suggests that dipolar bonding be acentric to avoid cancellation and, accordingly, totally fluorinated straight chain polymers are not generally useful.

The pyroelectric effect requires a net dipolar alignment. This is accomplishable by imposition of an electric field, generally a d.c. electric field, of appropriate strength. In a preferred class of materials herein such alignment or "poling" is "frozen in" so that the material manifests remanent polarization and so that the field need not be maintained during use. Other materials, however, at given operating temperatures do not exhibit remanent polarization and imposition of a field is required.

While an embodiment of the invention contemplates a detector so damped as to permit response at frequencies at and above mechanical resonance frequencies, other embodiments may operate in different manner. In an exemplary device use is made of the resonance frequency to enhance response of the pyroelectric element to modulation frequencies corresponding with resonance frequencies. Such devices may be so designed as to enhance the "ringing" effect (i.e., to avoid damping).

DETAILED DESCRIPTION

1. The Figures

Figure 1:
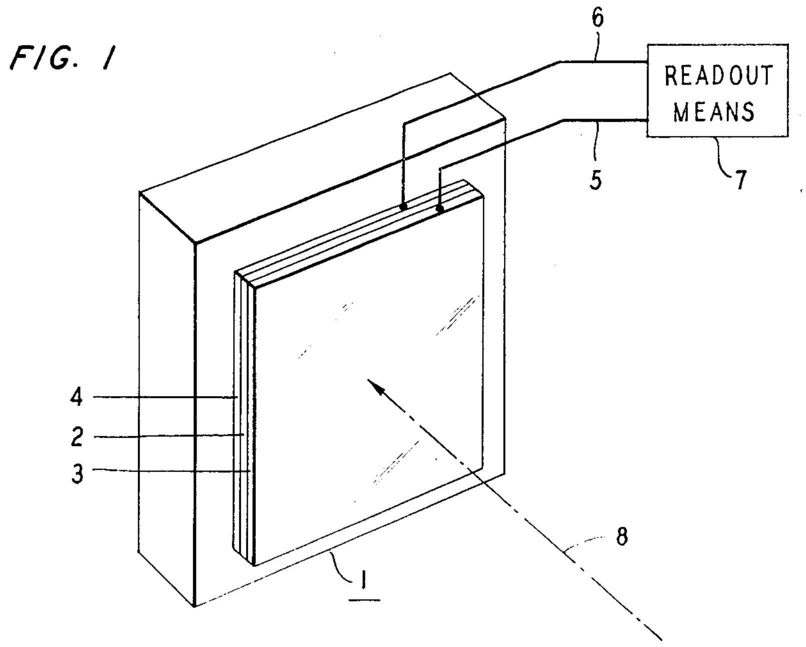
FIG. 1 is a perspective view, partly in section, of one type of pyroelectric device in accordance with the invention.

The device 1 of FIG. 1 consists of a polymer film layer 2 which is faced by electrodes 3 and 4 connected respectively by wire leads 5 and 6 to read-out means 7. The impinging radiation 8 may be modulated or not and may be of any wavelength which may be absorped in element 2. Absorption may be within the natural absorption band of the material, or in the alternative, it may be the result of an extrinsic cause such as an opaque outer layer or admixed absorptive material. Electrodes 3 and 4 are generally face electrodes and may, for example, be layers of adherent material such as silver paste. Layer 4 may serve the additional function of clamping the pyroelectric layer 2 so as to miminize mechanical vibration responsive to the piezoelectric effect.

For the device depicted, the direction of the net dipole moment is defined by the thickness direction of layer 2 intermediate electrodes 3 and 4. If layer 2 has remanent polarization at the operating temperature, such net moment is produced by short-term poling and maintenance of the field is not required during operation. Under other circumstances such a field may be useful. It may be either d.c. or a.c. (in the latter case of a frequency separated from the modulation or subcarrier frequency of concern) and may be imposed across the same electrodes 3 and 4 utilized for signal detection. In such event, read-out means 7 may be provided with electrical circuitry for discriminating between the fixed "poling" field and the signal. Such discrimination means may take the form of a tank circuit or its analog, a crystal resonator.

Figure 2:
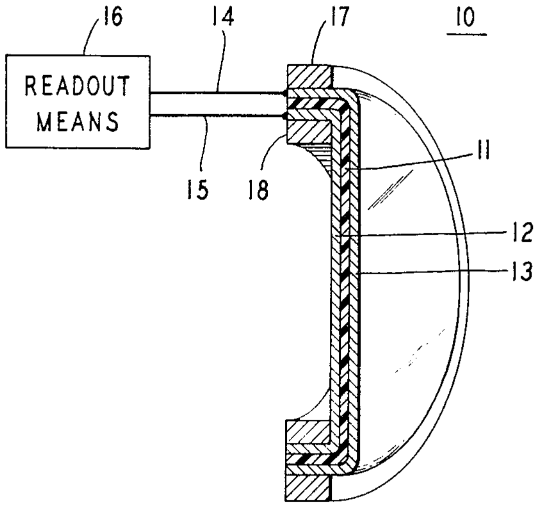
FIG. 2 is a perspective view, partly in section, of another type of pyroelectric device in accordance with the invention.

The device 10 of FIG. 2 is similar to that of FIG. 1 and again consists of a film of pyroelectric material 11, the surfaces of which are coated with conductive material to form electrodes 12 and 13 which are in turn provided with wire leads 14 and 15 connected to read-out means 16. In the embodiment shown film 11 is stretched between frames 17 and 18. The design in this instance is such as to enhance rather than to damp mechanical resonance due to the piezoelectric response to the volume expansion or contraction attendant upon reception of the incoming radiation.

2. Composition and Preparation

Certain fundamental requirements for materials of the invention have been described. It has been indicated that they must be possessed of net dipole moment. A preferred class which manifests remanent polarization has been described.

It is possible to prescribe preferred substituent groupings on the basis of the fundamental requirement, i.e., substantial dipolar moment. It has been stated that the dipolar strength is dependent upon proper distribution of substituent groupings which are separated from the members of the polymer chain in terms of electronegativity. Materials of this invention are generally carbon-containing, substituent bonding is generally to a carbon atom, and electronegativity is therefore to be measured relative to carbon. Probably the most useful bond is the carbon to fluorine bond, although other substituents such as any of the other halogens, and (or other substituents bonded to a carbon through an oxygen e.g., ester, acid, enol, ketone, etc.) hydroxyl, amide, imide and nitrate groupings are also useful. The requirement of net dipolar moment in turn requires that there not be total cancellation. A material such as a fully fluorinated ethylene polymer, while it contains strongly polar bonds, has no net dipole moment. By contrast, a partially fluorinated polymer of the same class such as trifluoroethylene polymer does have a net dipole moment and does therefore meet that inventive requirement.

The exact nature of the cooperation between dipolar bonds is not known. It may be, for example, that polymeric materials of the nature here concerned do not manifest spontaneous polarization in the manner of inorganic crystalline materials. It may be that materials which show retention of net dipolar moment are dependent not upon the pure energetics of dipole-to-dipole coupling but rather on the rigidity of the molecular system involved.

Regardless of the nature of the responsible mechanism, materials found suitable for the practice of the invention are found to be highly crystalline and are properly classified by space-group designations of the nine classes which correspond to crystalline symmetries which permit the existence of ferroelectricity. Accordingly, polyvinylidene fluoride is of the point-group designation $C_{2v}$. Other useful representative materials include polyacrylonitrile, polyvinylfluoride, poly-o-fluorostyrene and polyvinylidene chloride (all belonging to polar point groups i.e., $C_n$ and $C_{nv}$ where $n$ = 1,2,3,4 or 6).

A high degree of crystallinity, at least 10 percent on the usual basis as described in (*X-ray Properties of Polymers* by Alexander, Wiley 1969 (Chap. 3)), is certainly desirable. Experimentally, however, it has been determined that suitable samples do show some dipolar relaxation during use so that imposition of a field, even on a material manifesting remanent polarization, may result in some strengthening of response. This behavior is not characteristic of conventional ferroelectric materials and suggests that while crystalline materials of ferroelectric space-groupings may be preferred, suitable behavior may also be obtained in the total absence of ferroelectric coupling. For example, use may be made of materials having "frozen-in" dipole moment, i.e., material ordinarily classified as "electrets."

The fact remains that preferred materials are highly crystalline and do have space designations which permit ferroelectricity. Crystallographic orientation is easily achievable in the usual film sections by biaxial stressing, as for example by blowing into a mold. Poling, either short-term or continuous, requires imposition of a fairly high field ordinarily of the order of at least about 300 K volts per cm. (For the usual film which may have a thickness of about 20 micrometer a field of 600 volts may suffice.) As in conventional ferroelectrics, increasing temperature permits reduced poling fields. Initial poling is usually carried out with the material heated to near its melting point (and field is generally maintained as temperature is reduced).

While commercial films produced for example by flowing are suitable for the practice of the invention, alternative procedures may be equally rewarding. Under certain circumstances polymers deposited on metallic surfaces may be possessed of crystallographic orientation, or may conceivably be mechanically worked even as deposited films to yield such orientation. Films so formed, as for example by in situ polarization may, of course, be poled in the same manner as self-supporting films. Counter electrodes may be deposited in any conventional fashion and may or may not be supplemented with radiation-absorbing layers as described.

3. Example

In this section examples illustrative of experimental procedures utilized in the testing of dipolar polymers are described.

A detector was constructed from commercially available polyvinylidene fluoride film which was prepared by biaxial stressing. The film was about 50 percent crystalline as measured by density and/or x-ray. Thickness was about 19 micrometers. Electrodes were deposited on opposite faces by evaporatiOn of aluminum and poling was carried out by application of an electric field of 1,500 volts starting at about 120° C and by cooling to room temperature without removal of the field. The front face of the detector was a partially transmitting aluminum film. The detector was irradiated by use of a CW $CO_2$ laser emitting at a wavelength of about 10.6 micrometers at a level of a few milliwatts. The laser output was focused to an area approximately coextensive with the 2 millimeter by 2 millimeter area of the detector. The laser output was modulated so as to produce either single pulses or pulse trains having pulse repetition rates of from 1 Hz to 1,000 Hz. Voltage responsivity for a pulse train of about 100 Hz was about 17 volts per watt. Responsivity decreased as the reciprocal of the first power of the frequency. It was found that the detector response as displayed on a screen faithfully reproduced the input pulse shape of a pulse having a rise time of about 50 nanoseconds.

The experiment described is for a film detector which was "clamped" (i.e., glued) to a substrate much in the manner of the device depicted in FIG. 1. In other experiments freely supported stretched films arranged as shown in the device of FIG. 2 were utilized.

We claim:

1. Pyroelectric device comprising a body of a pyroelectric medium provided with means for sensing a pyroelectric response to incident radiation, said means including at least one electrode making electrical contact with the said body, characterized in that said body consists essentially of a normally solid polymer of polyvinylidene fluoride.

* * * * *